United States Patent [19]

Jordens

[11] Patent Number: 4,645,188
[45] Date of Patent: Feb. 24, 1987

[54] RESILIENT BEARING WITH A HYDRAULIC DAMPER

[75] Inventor: Ernst-Gunter Jordens, Damme, Fed. Rep. of Germany

[73] Assignee: Lemforder Metallwaren AG, Fed. Rep. of Germany

[21] Appl. No.: 686,142

[22] Filed: Dec. 26, 1984

[30] Foreign Application Priority Data

Dec. 28, 1983 [DE] Fed. Rep. of Germany ....... 3347273

[51] Int. Cl.$^4$ .......................... F16M 5/00; F16F 13/00; B60K 5/12
[52] U.S. Cl. .................................. 267/140.1; 248/562
[58] Field of Search ................. 267/8 R, 35, 113, 124, 267/129, 140.1, 140.2, 140.3, 140.5, 141, 141.2, 141.4; 188/311, 313, 298, 322.13, 322.15; 180/300; 248/562, 631, 634, 636; 92/97; 137/513.7

[56] References Cited

U.S. PATENT DOCUMENTS

| | | | |
|---|---|---|---|
| 2,966,351 | 12/1960 | Scholz | 188/298 X |
| 3,738,633 | 6/1973 | Pineau | 267/141 |
| 3,951,477 | 4/1976 | Townshend | 267/141.2 X |
| 4,399,987 | 8/1983 | Cucelli et al. | 267/35 X |
| 4,407,491 | 10/1983 | Kunihiro et al. | 267/141.4 X |

FOREIGN PATENT DOCUMENTS

| | | | |
|---|---|---|---|
| 0027751 | 4/1981 | European Pat. Off. | 267/35 |
| 3225700 | 11/1983 | Fed. Rep. of Germany | 267/140.1 |
| 0196341 | 11/1983 | Japan | 267/140.1 |

Primary Examiner—Douglas C. Butler
Assistant Examiner—Robert J. Oberleitner
Attorney, Agent, or Firm—McGlew and Tuttle

[57] ABSTRACT

A resilient bearing includes a cushioning member comprising an inner part, an annular element of a resilient material, and an outer part or shell, and a hydraulic damper having an inner space filled with a liquid and being divided by a partition into a working space and an equalizing space. The partition is provided with throttling passages for the liquid flowing therethrough, and the volumes of the separated spaces are variable. The hydraulic damper is accommodated in a housing which is independent of the cushioning member, and comprises a piston which is movable up and down in the working space, thereby varying the volume of the space, and is connected, directly or indirectly, to the inner part of the cushioning member.

8 Claims, 3 Drawing Figures

RESILIENT BEARING WITH A HYDRAULIC DAMPER

FIELD AND BACKGROUND OF THE INVENTION

This invention relates in general to bearing structures and in particular to a new and useful combination resilient bearing and hydraulic damper particularly for supporting engines on a mounting.

A bearing of this kind is disclosed in German Pat. No. 32 25 700. In this prior art construction, the cushioning element is made of rubber or another material having comparable properties, which is firmly bounded to an inner part and a sheet metal shell, in a manner such that the shell and the cushioning element directly enclose a working space which is separated from an equalizing space by a partition wall having a throttling hole. The equalizing space is bounded by a bellows (FIG. 1) or another cushioning element (FIGS. 7 and 8). Such resilient bearings are known only as rotationally symmetrical structures. The deformation of the resilient element under load directly changes the volume of the working space. Therefore, prior art resilient bearings of this kind can be designed with unequal resiliences in the three coordinate directions only to a very limited extent, and are unsatisfactory in complying with the general requirement imposed on vibration damping or suppression. Since the cushioning element acts directly on a liquid in the working space and the element must take up the load and the building up of liquid pressure, the stiffness of the material of this element is predetermined.

SUMMARY OF THE INVENTION

The invention is directed to a construction of a resilient bearing eliminating the drawbacks of the prior art.

In accordance with the invention, a resilient bearing and hydraulic damper comprises an annular cushion assembly of an outer annular rigid shell, a rigid inner part having a central bore therethrough and an annular central part of a resilient material arranged between and bonded to the inner and outer parts. The annular rigid outer part also engages over an upper extending portion of a damper housing which has an interior working space which is subdivided by a partition wall into an upper hydraulic damper space and a lower equalizing space and a flow throttle therebetween. A piston member having a rod portion which is adapted to be connected to a part extends through the bore of the rigid inner part of the cushion assembly and into an opening of the housing through the working space of the damper housing. The piston is enclosed by a flexible case and the lower equalizing space is also enclosed by a flexible space which may expand.

What is thereby obtained is that while moving under load, the resilient member and the hydraulic damper depend on each other in operation and thus can be adjusted to an optimum effect. A substantial advantage is that, due to its inherent resilience, the cushioning member can take up alone the weight applied against the bearing, while the hydraulic damper can be adjusted to take up the dynamic loads and can therefore be made smaller and less expensive than in the prior art designs. At the same time, the throttling elements in the partition wall can be better adjusted, namely already before the mounting in a vehicle, etc., and more sensitive throttling means no longer exposed to the static load can be provided for improving the operation of the damper.

According to the invention, the cushioning member may be designed with unequal resiliences in the three directions X, Y and Z, so that the resiliences may be adjusted, for example, to accelerations in curves, or to the spring system, in different ways, such as by providing portions with an unequal Shore hardness of the resilient material, or recesses, or inserts in the material.

Accordingly, it is an object of the invention to provide an improved resilient bearing and hydraulic damper in which the bearing includes an annular cushion assembly which is secured to the damper for housing and it is secured to a piston rod portion of a piston member which has a piston which rides in an upper working space of a hydraulic damper which also has a lower equalizing space connected thereto through a throttle valve.

A further object of the invention is to provide a resilient bearing and hydraulic damper which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
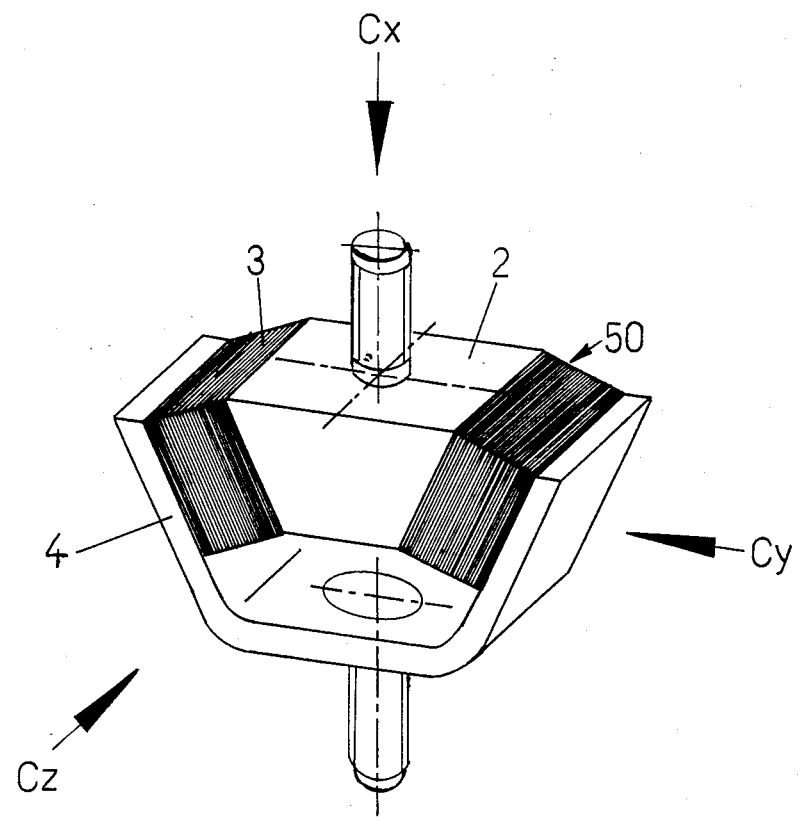
FIG. 1 is a diagrammatical perspective view of a cushioning member.

Referring to the drawings in particular the invention embodied therein comprises a combination resilient bearing and hydraulic damper which comprises an upper annular cushion assembly made up of a rigid inner part 2, an intermediate resilient part 3 and an outer cushion shell 4. The outer cushion shell part 4 engages around an upstanding portion of a housing 6 of a hydraulic damper. The housing 6 has an interior upper fluid working space 15 and a lower equalizing space 13 which are separated by a partition wall assembly 7 which has a throttle therethrough. A piston member includes a piston rod portion 17 extending through a bore of the rigid inner part 2 of the cushion assembly and has a piston portion 18 which is disposed in the upper working space 15 and encased by a flexible casing 16.

FIG. 1 shows a design generally designated 50 of a cushioning member, and the loads acting thereon in the direction CX, CY, CZ in a three-dimensional coordinate system. The cushioning member comprises an inner part 2 designed to be secured to the constructional part to be supported, a resilient element 3 of rubber or another material having comparable properties, and a shell 4 designed to be secured to the supporting constructional part. Resilient element 3 is firmly bonded, in a manner known per se, to inner part 2 which is metallic, and to shell 4 which also is metallic.

Figure 2:
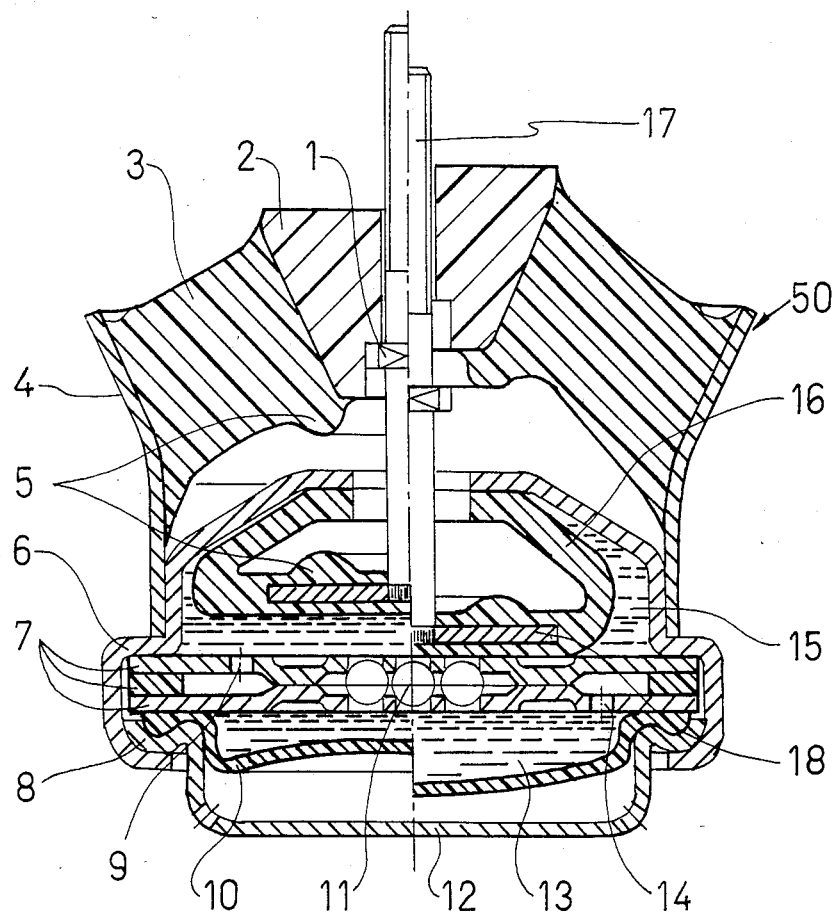
FIG. 2 is a vertical sectional view of an embodiment of the invention.
Figure 3:
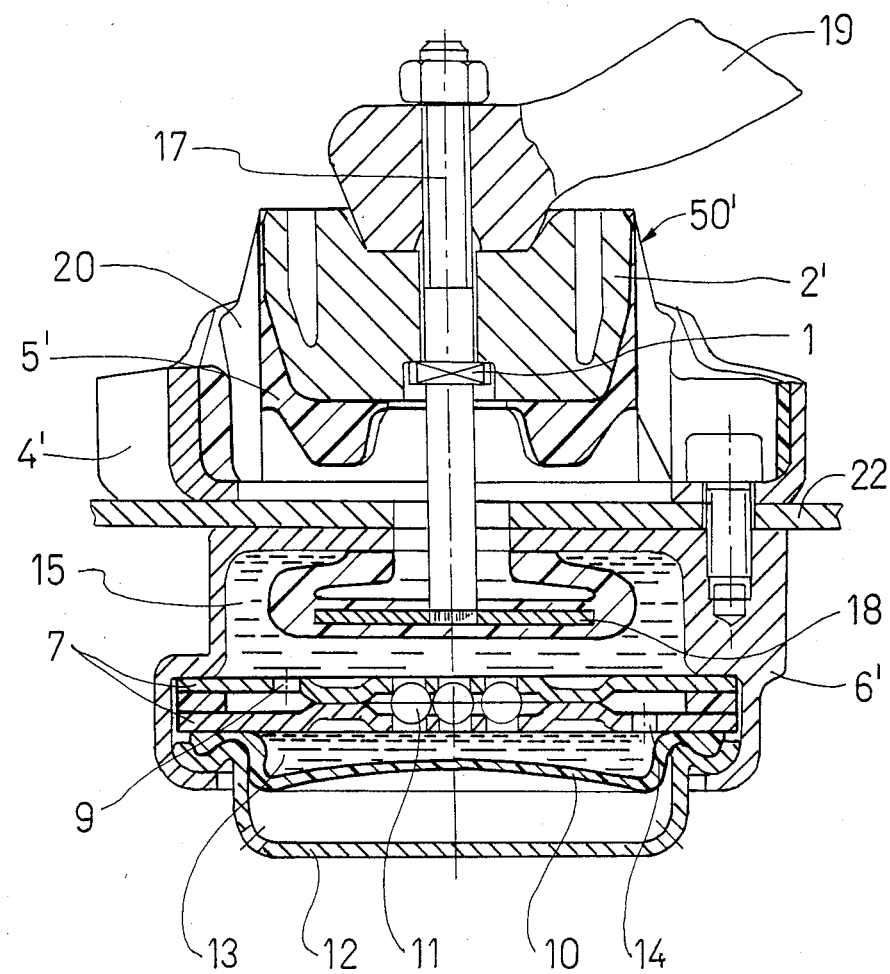
FIG. 3 is a similar view of another embodiment.

FIGS. 2 and 3 show the arrangements 50 and 50' in detail comprising a hydraulic damper which is accommodated in housing 6 independently of the cushioning member, and parts secured thereto. The inner space of housing 6 is divided by a partition wall 7 into an upper working space 15 and a lower equalizing space 13. Equalizing space 13 is bounded by a flexible case 10 which is protected against mechanical damage by a rigid cover 12 within which it is elastically pliable. Within working space 15, a piston 18 is mounted which is secured to a vertically guided piston rod 17 and enclosed in a flexible case 16. By means of the case 16, the piston 18 is isolated from the housing 6. The piston rod 17 extends outwardly out of housing 6 and through inner part 2 in which it is vertically adjustable and which is firmly bonded, through resilient element 3, to the shell 4. The shell 4 of the cushioning member is supported on a circumferential shoulder of housing 6 and firmly connected thereto. Between piston rod 17 and inner part 2, a protection against torsion is provided, comprising a collar 1 on the piston rod having a rotationally asymmetrical configuration in a view from above, and a correspondingly shaped recess in the inner part. Due to this provision, piston 18 and piston rod 17 must follow the movements imparted to inner part 2. The particular shape of flexible case 16 and the aperture in housing 6 which is larger than the diameter of piston rod 17, makes the piston rod capable of departing from its vertical position and thus of transmitting also lengthwise and transverse movements. The collar 1 of piston rod 17 may be vertically displaceable, for example screwed on the piston rod, to adjust the entire bearing. The collar 1 also limits the vertical downward movements of inner part 2 relative to piston rod 17, so that with a corresponding adjustment of securing piston rod 17 to the constructional part to be supported, a firm connection is established between the piston rod 17 and the inner part 2. Consequently, the bearing can be adjusted vertically to adapt to the static load. The underside of the resilient body 3 is formed with a stop 5, which, upon a downward movement of inner part 2, applies against housing 6 and thus prevents further motion. Another stop 5 is formed on top of piston 18, limiting the upward movement of the piston.

FIG. 3 shows another embodiment generally designated 50' of the invention where the component parts are shaped differently, to obtain certain desired properties of the bearing. FIG. 3 also shows a connection between piston rod 17 and the constructional part 19 to be supported. To obtain definite spring rates, resilient element 3 is provided with through going holes 20, so that it has the configuration of a spoked wheel.

It is also shown in FIG. 3, that shell 4' may be screwed to housing 6' of the damper with the interposition of a plate 22. This makes clear that cushioning member and the hydraulic damper operate independently of each other and do not necessarily have integrated structures. Both the damper and the cushioning member may be mounted separately.

The partition wall 7 between working space 15 and equalizing space 13 is shown as a double-walled structure enclosing an annular channel and forming as many baffling elements as possible for the liquid flowing from one into the other space. To obtain in addition that the damper responds to small amplitudes of the vibrations to be damped only slightly, while strongly damping large amplitudes, the partition wall is provided with through holes and valve balls 11 received therein. With small vibration amplitudes, the liquid in the working space 15 can vibrate along with the liquid in equalizing space 13, since the valve balls are freely movable. In such an instance, the throttling effect of the interior passages of the partition wall does not come to bear. The free motion of the balls is adjustable by changing the depth of their displacement. With larger vibrational amplitudes, valve balls 11 close the through holes and the liquid is forced to flow from working space 15 through a throttling hole 9 into the annular space of double-walled partition 7 and therefrom through an outlet hole 14 provided at another location, into equalizing space 13. This dissipates the vibrational energy. This effect can be augmented by providing throttling apertures of particular configuration, such as kidney-shaped. The operation of the damper can thus be controlled. The inventive features make it possible to design the piston rod 17 as a safety bolt, so that upon an accident, for example, the engine of the motor vehicle is not torn out. Only piston rod 17 breaks so that the cushioning member and the damper and thus also the engine and the vehicle frame, are separated from each other.

The cushion assembly 3 is advantageously constructed with unequally stiff resiliences in the vertical, longitudinal and transverse directions.

While specific embodiments of the invention have been shown and described in detail to illustrate the application of the principals of the invention, it will be understood that the invention may be embodied otherwise without departing from such principles.

What is claimed is:

1. A resilient bearing and hydraulic damper combination comprising, an annular cushion assembly of an outer annular rigid shell, a rigid inner part having a central bore therethrough and an annular intermediate central part of resilient material arranged between and bonded to said inner and outer parts, a hydraulic damper part having a damper housing with an upstanding part engaged within said outer part of said annular cushion assembly and having a top opening aligned with the bore of said rigid inner part and having an interior fluid working space with liquid therein, a piston member having a rod portion extending through the bore of said rigid inner part and adjustably engaged therewith and extending through the opening of said damper housing and having a piston portion at its lower end disposed in said working space, a partition wall extending across said working space and dividing it into an upper hydraulic damper space above said wall and a lower equalizing space below said wall, and a flow throttle in said partition wall permitting controlled flow from said upper working space and said lower equalizing space and a flexible case covering said piston portion and isolating said piston portion relative to said damper housing.

2. A resilient bearing and hydraulic damper combination according to claim 1, wherein said outer shell part of said cushion assembly includes an annular portion extending below said intermediate central part and engaged over a side of said damper housing and firmly connected thereto.

3. A resilient bearing and hydraulic damper combination according to claim 1, including means carried by said piston engaged with said inner part preventing rotation relative to said outer and inner part.

4. A resilient bearing and hydraulic damper combination according to claim 3, wherein said means connected to said piston rod comprises a collar around said piston rod having a rotationally symmetrical shape, said rigid inner part of said cushion assembly having a bottom face with a recess into which said collar extends.

5. A resilient bearing and hydraulic damper combination according to claim 4, wherein the recess of said inner part is bounded by a shoulder at its upper end limiting the upper motion of said piston rod relative to said inner part.

6. A resilient bearing and hydraulic damper combination according to claim 1, wherein said resilient intermediate part of said cushion assembly includes a downwardly extending portion forming a stop limiting the downward movement of the cushion assembly relative to the damper housing and the upper motion of the piston relative to the damper housing.

7. A resilient bearing and hydraulic damper combination according to claim 6, wherein said cushion assembly is constructed with unequally stiff resiliences in the vertical longitudinal and transverse directions.

8. A resilient bearing and hydraulic damper combination according to claim 1, wherein said piston rod comprises a safety bolt.

* * * * *